(No Model.)
R. GOODBODY.
AUTOMATIC VISIBLE FEED INJECTOR.
No. 446,749. Patented Feb. 17, 1891.
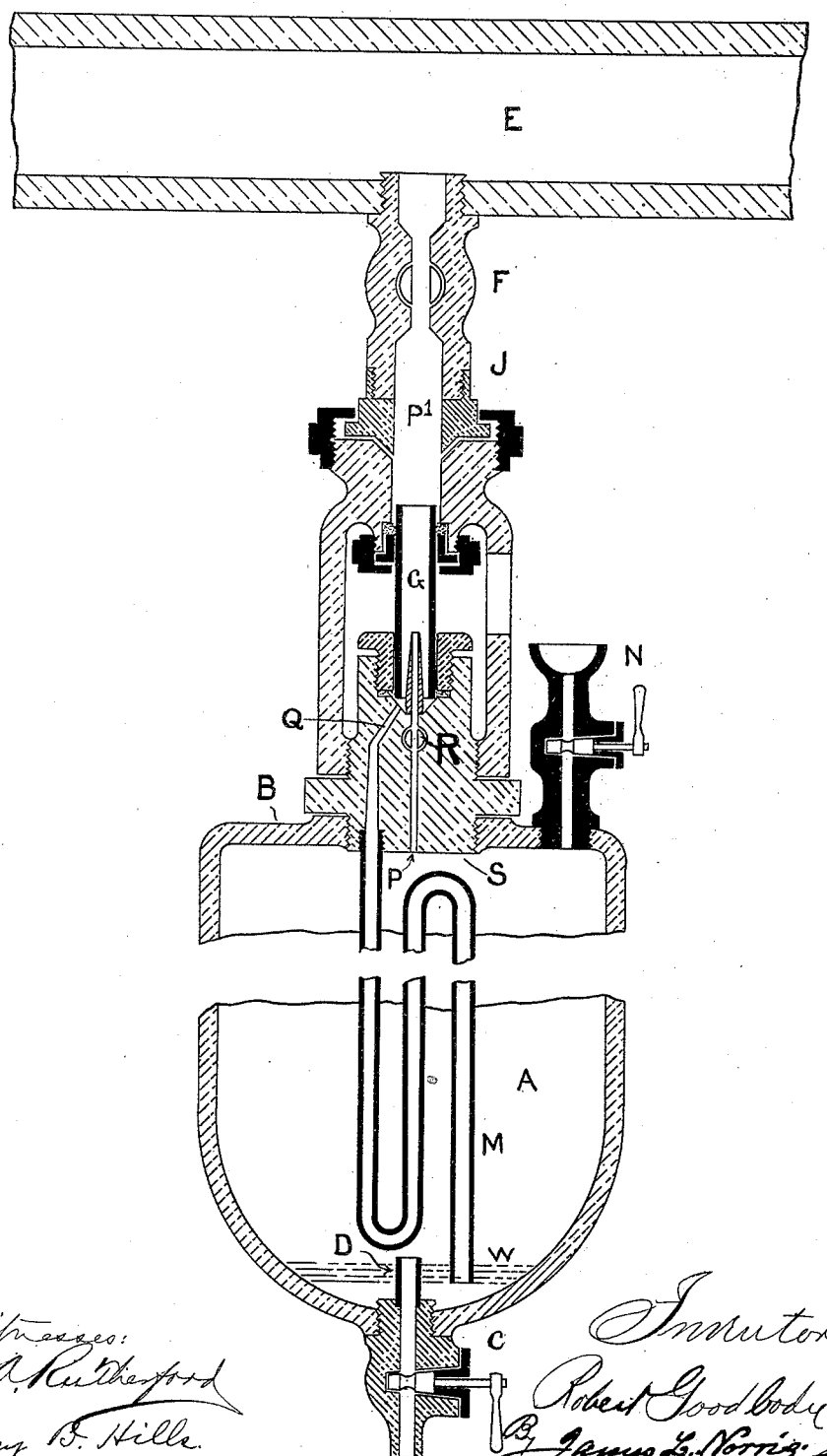

UNITED STATES PATENT OFFICE.

ROBERT GOODBODY, OF UPTON, IRELAND.

AUTOMATIC VISIBLE-FEED INJECTOR.

SPECIFICATION forming part of Letters Patent No. 446,749, dated February 17, 1891.

Application filed February 28, 1890. Serial No. 342,073. (No model.)

*To all whom it may concern:*

Be it known that I, ROBERT GOODBODY, a subject of the Queen of Great Britain and Ireland, and residing at Upton, Clara, King's county, Ireland, have invented an Automatic Visible-Feed Injector, of which the following is a specification.

This invention relates to the construction and arrangement of an apparatus capable of regulation by means of a tap, whereby a liquid compound is automatically and regularly discharged from a receptacle and caused to flow into the boiler for the very desirable object of preventing or greatly reducing the formation of scale in boilers, and for the purpose of separating such scale when so formed from the plates, so that the same can be removed without resorting to the use of implements which are injurious to the plates of which the boiler is composed.

My invention is an improvement on the automatic visible-feed injector for which Letters Patent No. 423,758 were granted to me March 18, 1890; and it consists in the construction, arrangement, and combination of parts hereinafter described and claimed.

The invention is illustrated by the accompanying drawing, in which the figure represents a vertical central sectional view of an apparatus embodying my invention.

In the drawing, the letter A indicates the vessel for containing the liquid compounds to be delivered to the feed-water flowing through the pipe E to a boiler or range of boilers.

The vessel A is provided with a cover B, having a vertical tubular connection with the feed-pipe, which connection is for a part or all of its length transparent. As here shown, the connection comprises a vertical passage P, through the screwed plug S, and a glass tube G, communicating at its lower end with the said passage and at its upper end with the passage P', leading through coupling J and valve or pipe F to the feed-pipe E.

An outlet or clearance-cock C is attached to the bottom wall of the vessel A, and is provided with a pipe-extension D, rising a short distance in the vessel above the inside of its lowermost portion and above the lower extremity of the doubly-bent tube M in such a manner that a water seal, as at W, is constantly preserved at the lower end of the said tube.

In the screw-plug S, below the bottom of the glass tube G, a branch Q is provided, with which is connected the before-mentioned pipe M, bent somewhat as shown, with its lower end terminating below the top of pipe extension D, for the purpose hereinbefore described.

In operation the vessel A is supplied, through the filling-cup N, with a liquid compound somewhat lighter than water, which compound floats on the water that cannot leave the vessel below the upper end of the pipe-extension D, whereby the lower end of the tube M is constantly immersed in the water below the liquid compound floating thereon. On the valve or tap F being opened, communication is established with the bottom of the vessel by the tube M, and on opening the valve or tap R the light compound is injected through the vertical connection P, G, and P', and the compound on entering the feed-pipe amalgamates with the water passing therethrough to the boiler or boilers. The source of pressure that produces the injection jet, causing the liquid compound to leave the vessel A and pass through the vertical connection into the feed-pipes, is due to the difference in the specific gravity of the water and liquid compound, all liquids of an oily nature being lighter than water. Water being heavier, it is conveyed by tube M to the bottom of the vessel A, the oily liquid compound floating on the water, and is displaced and caused to pass through the opening into the vertical connection by the difference in the weight of a column of water in tube M and the weight of a column of liquid compound of equal depth in the vessel A. The water, being heavier, settles to the bottom and forces the liquid compound through the vertical connection at a rate proportionate to the opening of the valve R.

By placing in the vessel A the doubly-bent pipe M, of increased length as compared with the pipe employed in the apparatus described in my said patent, No. 423,758, the hot feed-water from the pipe E passing therethrough imparts more to the heavy hydrocarbon oil, thereby enabling it to leave the vessel more freely and regularly, and by connecting this doubly-bent pipe M with a branch Q, leading from directly beneath the vertical tube G, the tap employed in my former patented apparatus is dispensed with.

What I claim is—

The combination, with the vessel A, for injecting into the feed-water pipe of a boiler a liquid compound to reduce the formation of scale, and a vertical tubular connection between the upper end of said vessel and the feed-pipe, of the branch connection Q, placed beneath the lower end of said vertical tubular connection, and the doubly-bent pipe M, located in said vessel and communicating with the lower end of said branch, substantially as shown and described.

In testimony whereof I have signed my name to this specification in the presence of two subscribing witnesses.

ROBERT GOODBODY.

Witnesses:
ALBERT WEBB,
  50 *Dame Street, Dublin, Gent.*
JONATHAN GOODBODY,
  *Dame Street, Dublin, S. B.*